Sept. 29, 1953 W. J. PAX 2,653,571
HOG FEEDER
Filed May 7, 1952 3 Sheets-Sheet 1
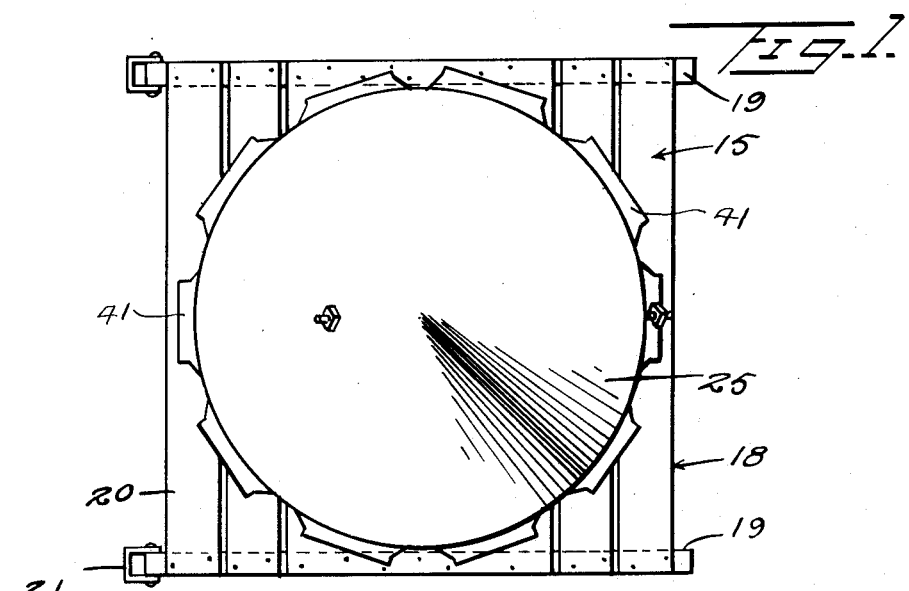
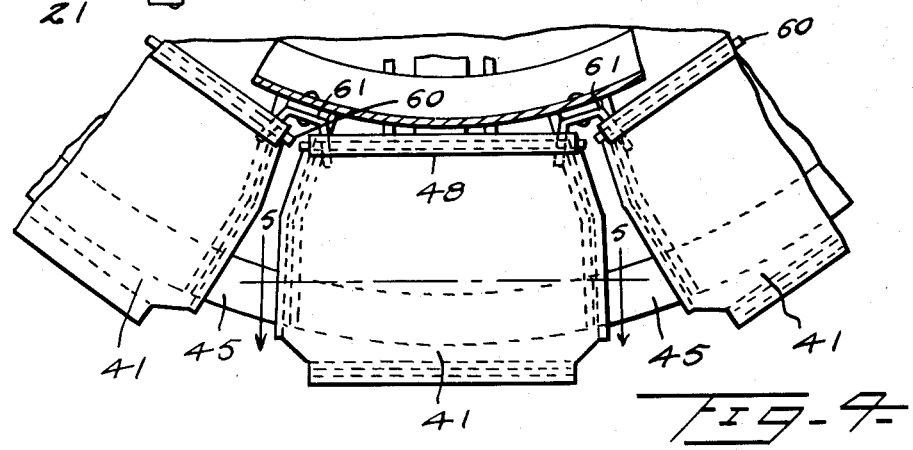
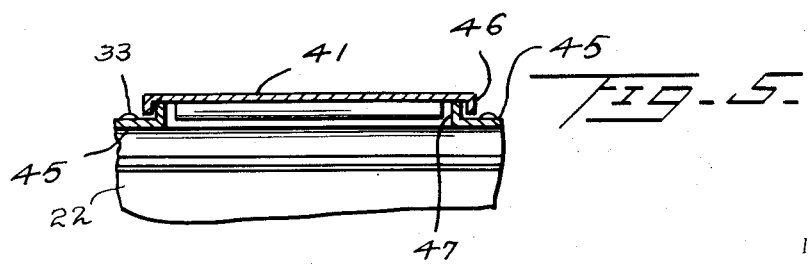
INVENTOR
William J. Pax
BY Kimmel & Crowell
ATTORNEYS Sept. 29, 1953 W. J. PAX 2,653,571
HOG FEEDER
Filed May 7, 1952 3 Sheets-Sheet 2
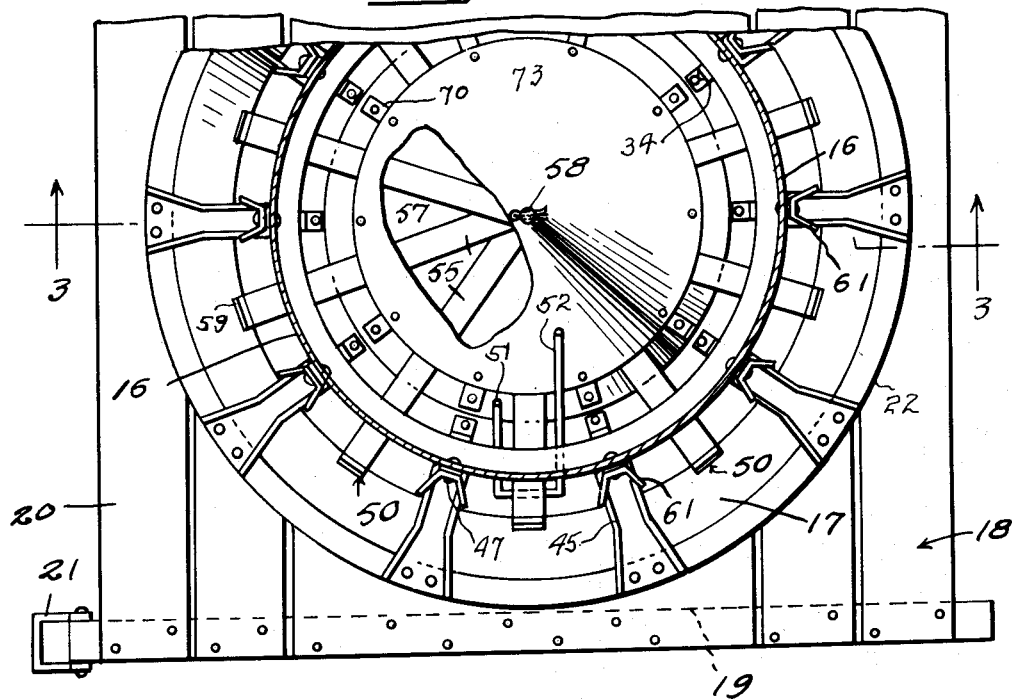
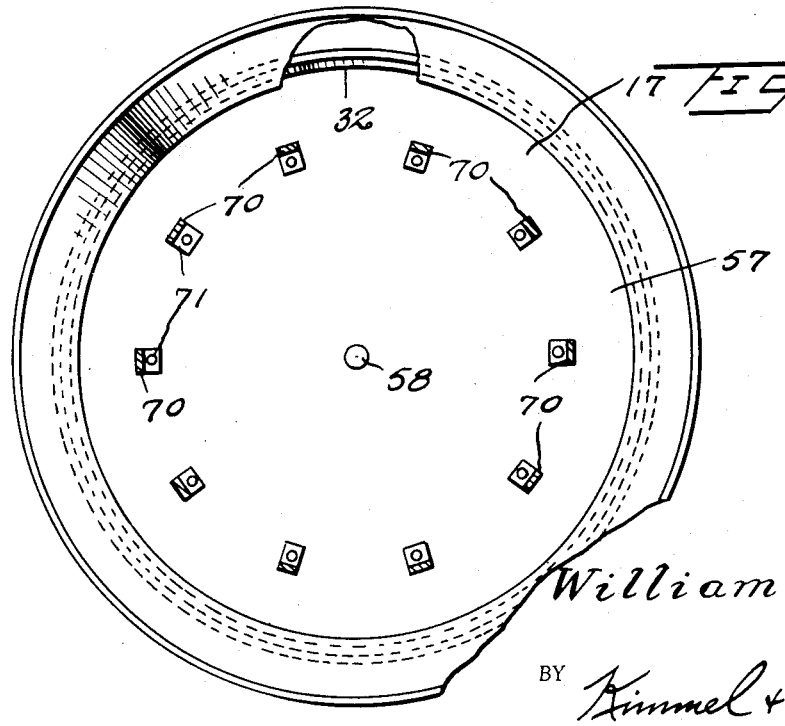
INVENTOR
William J. Pax
BY Kimmel & Crowell
ATTORNEYS Sept. 29, 1953 W. J. PAX 2,653,571
HOG FEEDER
Filed May 7, 1952 3 Sheets-Sheet 3
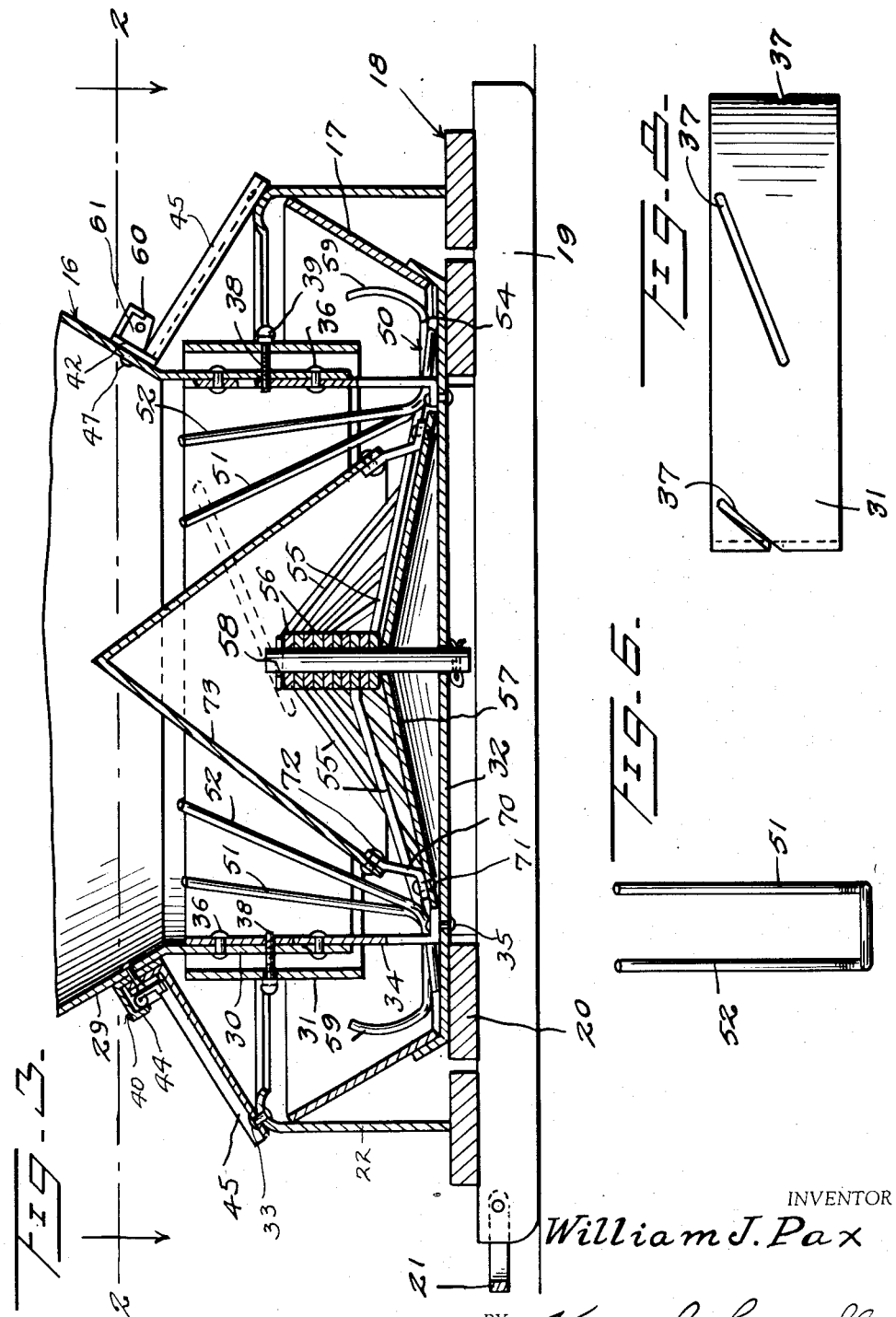
INVENTOR
William J. Pax
BY Kimmel & Crowell
ATTORNEYS Patented Sept. 29, 1953

2,653,571

UNITED STATES PATENT OFFICE 2,653,571

HOG FEEDER

William J. Pax, Celina, Ohio

Application May 7, 1952, Serial No. 286,463

1 Claim. (Cl. 119—53.5)

This invention relates to hog feeders and more particularly to one in which the feed is agitated by an animal feeding therefrom.

It is an object of this invention to provide in an improved hog feeder of the type shown in my Patent No. 2,513,200. issued June 27, 1950, for Hog Feeder, which has a feed pan and a hopper supported above the feed pan so that the feed in the hopper will fall into the feed pan where it may be taken by an animal, a means for keeping the weight of the feed off the agitators.

Another object of this invention is to provide a hog feeder having a hopper and a feed pan wherein the feed is adapted to flow from the hopper to the feed pan under an adjustable valve or plate in the feed pan whereby the flow of feed may be varied according to the desire of the owner or operator thereof.

A further important object of the invention is the provision of an improved means, comprising a supplemental interior cone, for keeping the weight of the feed off of the agitators to facilitate free flow of the feed and increase the ease with which the agitators may be moved.

With the above and other objects in view, my invention consists in the arrangement, combination and details of construction disclosed in the drawings and specification, and then more particularly pointed out in the appended claim.

In the drawings—

Figure 1 is a top plan view of one form of device embodied in the instant invention, Figure 2 is an enlarged fragmentary horizontal sectional view taken substantially along the line 2—2 of Figure 3, as viewed in the direction indicated by the arrows, Figure 3 is an enlarged longitudinal sectional view taken substantially along the line 3—3 of Figure 2, as viewed in the direction indicated by the arrows, Figure 4 is an enlarged fragmentary view showing a constructional detail, Figure 5 is a sectional view taken substantially along the line 5—5 of Figure 4, as viewed in the direction indicated by the arrows, Figure 6 is a plan view of one of the agitators as disclosed in Figure 3, Figure 7 is a fragmentary horizontal sectional view taken above the lower cone, showing the supporting means for the upper cone in section, Figure 8 is an enlarged side elevational view of the valve member shown in Figure 3, disassociated from the remaining structure.

Similar reference characters refer to similar parts throughout the description of the drawings.

Referring to the drawings, the numeral 15 designates generally a hog feeder constructed according to an embodiment of my invention. The feeder 15 is formed with a hopper 16 for retaining a supply of feed and a feeder pan 17 from which the animals may take the feed. The entire feeder 15 is adapted to be supported on a base or skid 18, having a pair of oppositely disposed side members 19 which are rounded at their ends so the skid 18 may readily slide along the ground, and transverse members 20 fixed to the sides 19 on which the pan 17 is adapted to rest. Lugs 21 or handles are fixed to the ends of the side members 19 for pulling the skid 18 and feeder 15 from place to place.

The feeder 15 is preferably made of galvanized steel sheet metal but may be made of other suitable material for holding the feed and resisting the weather. The upper end of the body is open and this opening is adapted to be closed by a substantially conical cover 25.

The lower end 29 of the hopper 16 is frustroconical in shape, having walls converging inwardly, and the frustro-conical portion 29 is terminated at its lower end with a short cylindrical section 30 through which the feed passes as it leaves the hopper 16.

A plurality of L-shaped supporting bars 34 are fixed to the bottom 32 of pan 17 by rivets 35, and extend upwardly to be fastened to the lower section 30 of the hopper 16 by rivets 36, or other suitable fastening devices, for supporting the hopper 16 above the feed pan 17, concentric thereto, with the lowermost edge of the lower section 30 spaced upwardly from the bottom 32 of the feed pan 17 so that the feed may pass from the hopper 16 into the feed pan 17.

In order to vary this distance between the lower edge of the hopper 16 and the bottom of the pan 17, to vary the rate of flow of the feed therethrough, I have provided a cylindrical valve 31 which is adjustably secured to the lower end 30 of the hopper 16. The valve 31 is formed of an open ended cylindrical body having a series of angularly inclined slots 37 through the walls thereof. Screws 38 engage through the walls of the section 30 and through the slots 37. The valve 31 is fastened to the section 30 by wing nuts 39 on the screws 38 so that the distance between the hopper 16 and bottom of the pan 17 may be varied by rotating the valve 31 whereupon the valve 31 will be raised or lowered by the screws 38 engaging in the inclined slots 37.

A substantially inverted U-shaped channel member 40 is fixed to the convergent walls of the frustro-conical section 29 of the hopper 16 at the juncture of the sections 29 and 30, to provide a rain shield and hinge barrel for the closures 41 of the feed pan 17. The member 40 is formed with an inner edge 42 for engaging the wall of the section 29, and the outer edge is formed with polygonal straight edges 44. The outermost edge of the member 40 is shorter than the inner edge or arm thereof so the end of the door 41 may be engaged therebetween.

An elongated U-shaped channel section 45 extends from each angle of the shield 40 outwardly over the rounded upper edge of a cylindrical shield 22 and is fixed in this position by rivets 33, to provide downwardly and outwardly extending closure supporting means.

Closures 41 are provided for covering the feed pan 17 and one of such closures 41 is provided for each straight edge 44 of the shield 40. The closures 41 are each of trapezium shape, having a pair of outwardly divergent long sides extending radially from the center of the feeder 15. The outwardly divergent sides are provided with downwardly extending flanges 46 which engage in the channels 45, the flange 46 on one side of the closure 41 engaging in one channel 45 and the other flange 46 engaging in another channel 45. The inner edge of the closures 41 is provided with a barrel 48 through which extends a rod 60. Each end of the rod then passes through a hole in end plate 61, which is a U-shaped plate forming a hinge bearing for the closures 41. The U-shaped plate 61 is held in place by the same rivet 47, which holds the U-shaped channel section 45. The rod 60 is then held in place by a cotter key or other securing means.

As the feed is taken by the animals from the feeding pan 17, the doors 41 being open, the feed in the hopper flows under the edge of the valve 31 into the pan 17. By reason of the consistency of the feed and the restriction to its free flow, the flow is often uneven and at times even stopped completely. In order to provide for a smooth even flow of the feed from the hopper 16 into the pan 17, I have provided agitators for moving the feed in the hopper and loosening it sufficient to permit a steady flow past the valve 31. Certain other feeders have been provided with agitators for this same general purpose, but the agitators constructed according to my invention are activated by the animal while feeding, thus providing agitation of the feed at exactly the time it is needed.

As there are provided a plurality of doors 41 from which the hogs may feed, means are provided within the feeder 15 between the confines of each door 41 for agitating the feed in the immediate vicinity thereof. Such means comprise a plurality of agitating members 50 having rods 51 and 52 thereon.

Each member 50 consists of a flat bar of substantially L-shape, the lower arm thereof being at an obtuse angle to the upper arm whereby the lower arm, as 54, may be held horizontally while the upper arm, as 55, is at an angle to the vertical center line of the hopper 16. An eye 56 is secured to or formed on the upper end of the arm 55, parallel to the lower arm 54.

For supporting the agitators 50 in the feeder, I have provided a conical base 57 concentric thereto which is secured at its lower divergent end to the bottom 32 of the pan 17, within the edges of the section 30 of the hopper 16, and a rod 58, centrally of the feeder 15 extending vertically from the bottom of the pan 17, above the base 57. The edge 56 of each of the agitators 50 loosely engages about the rod 58, with the arm 55 adjacent the surface of the base 57 and the arm 54 extending into the feeding pan 17 from below the edge of the valve 31 and spaced upwardly from the bottom 32, whereby the nose of an animal may strike the arm 54 and cause a movement of the agitator 50. The rods 51 and 52 are fixed to the bar 55 near the outer end thereof and extends into the cylindrical section 30 of the hopper 16. The free outer end 59 of the arm 54 may be bent upwardly where it will extend upwardly in the feeding pan 17 to be more readily struck by the nose of the animal.

Means are provided for keeping the feed contained in hopper 16 from bearing directly on the agitator arms 55 and take the form of a plurality of substantially L-shaped strips 70 (see Figs. 3 and 7), secured as by rivets 71 to spaced peripheral points on lower cone 57. To the upper ends of members 70 there is secured, as by rivets 72, a second conical member 73 which overlies center post 58 and all of the agitator arms 55, thus precluding feed from interfering with the movement of the agitators or clogging the space between the eyes 56. It will be obvious that the agitator elements may be readily moved between the spaced supporting members 70 in the manner above described and that the conical member 73 will afford a free space directly over the agitator arms 55 and their associated supporting shaft.

I do not mean to confine myself to the exact details of construction herein disclosed, but claim all variations falling within the purview of the appended claim.

What I claim is:

A hog feeder comprising a cylindrical hopper, a frustro-conical lower section on the lower end of said hopper, a feeding pan below said hopper, a lower cylindrical section on said hopper extending from the lower convergent end of said frustro-conical section, supporting bars fixed on said pan and said hopper for supporting said hopper above said feeding pan with the lowermost edge thereof spaced upwardly from said pan, a conical base fixed to said pan extending convergingly upwards in said hopper, a shaft extending upwardly from the apex of said base, a cylindrical plate carried by the lowermost end of said hopper slidable thereon for closing the space between said hopper and said pan, means for fixing said plate in adjusted position, and feed agitators loose on said shaft, said agitators including a substantially L-shaped flat bar, one arm of said bar extending horizontally into said feeding pan, an eye on the upper end of the other arm engaging about said shaft, rods extending from said other arm into the said frustro-conical section, U-shaped rods secured to said first arm and formed with legs extending parallel to said other arm into said lower cylindrical section for agitating the feed in said frustro-conical section and in said lower cylindrical section respectively upon rocking motion of said agitators, a plurality of trapezium-shaped closures for said feed pan, a rolled upper edge on said closures forming a tube, U-shaped bearing brackets fixed on said feeder at each end of said closures, a rod extending through said bearings and said tube, outwardly divergent sides on said closures, downwardly extending flanges on said sides, U-shaped supporting members on said feeder between adjacent closures, said members tapering inwardly of said feeder, said flanges engageable in said members for sealingly supporting said closures in the closed position thereof, substantially L-shaped supporting brackets secured to said base at spaced peripheral points between said agiating members and serving as stops for limiting the movement of individual agitators to a distance not greater than the width of a closure, and a conical deflector secured to said brackets and positioned over said agitators having a space between the face thereof and said feed pan to allow movement of said agitators, said deflector keeping the weight of the food in said hopper off said agitators.

WILLIAM J. PAX.

References Cited in the file of this patent

UNITED STATES PATENTS

| Number | Name | Date |
|---|---|---|
| 1,175,124 | Clough | Mar. 14, 1916 |
| 2,513,200 | Pax | June 27, 1950 |

FOREIGN PATENTS

| Number | Country | Date |
|---|---|---|
| 206,561 | Great Britain | Nov. 15, 1923 |
| 713,353 | France | Aug. 11, 1931 |